United States Patent [19]

Toni et al.

[11] Patent Number: 4,888,451

[45] Date of Patent: Dec. 19, 1989

[54] ELECTRICAL CONTINUITY MEANS FOR COMPOSITE JOINTS

[75] Inventors: Darryl Toni, North Haven; Eliasz Poss, Guilford, both of Conn.

[73] Assignee: United Technologies Corporation, Hartford, Conn.

[21] Appl. No.: 277,382

[22] Filed: Nov. 29, 1988

[51] Int. Cl.[4] .............................................. H02G 15/08
[52] U.S. Cl. ................................... 174/94 R; 174/2; 244/131; 361/218
[58] Field of Search ................. 174/94 R, 2; 361/218; 244/1 A, 131

[56] References Cited

U.S. PATENT DOCUMENTS

| | | | |
|---|---|---|---|
| 2,125,882 | 8/1938 | Berliner | 244/131 X |
| 2,274,422 | 2/1942 | Mahoney et al. | 174/73.1 |
| 3,556,591 | 12/1985 | Bannink, Jr. | 244/131 X |
| 3,755,713 | 8/1973 | Paszkowski | 361/218 |
| 3,989,984 | 11/1976 | Amason et al. | 361/212 |
| 4,478,915 | 10/1984 | Poss et al. | 174/35 R X |
| 4,502,092 | 2/1985 | Bannink, Jr. et al. | 361/218 |
| 4,574,325 | 3/1986 | Holton | 361/218 |
| 4,789,918 | 12/1988 | Bannink, Jr. | 244/1 A X |

Primary Examiner—Morris H. Nimmo

[57] ABSTRACT

A means for conducting an electrical charge from one nonconducting article having a conductive layer thereon to another article across a joint, wherein the means is displaced from the mechanical interface of the joint. This reduces joint stresses from electrical currents.

20 Claims, 2 Drawing Sheets

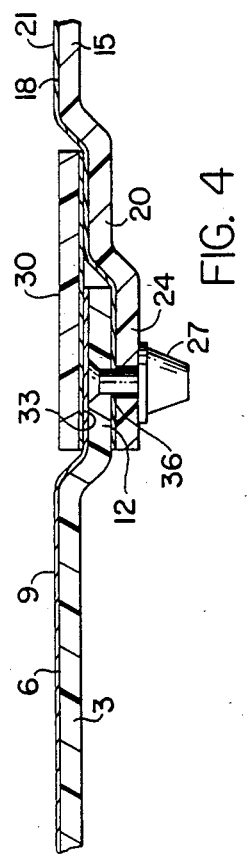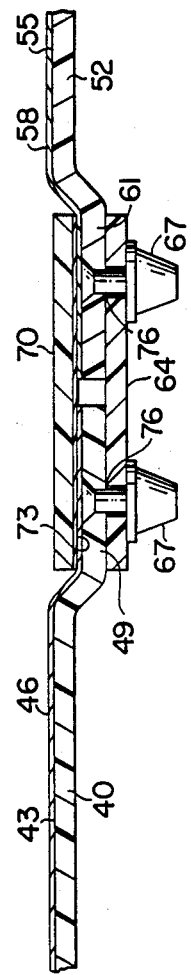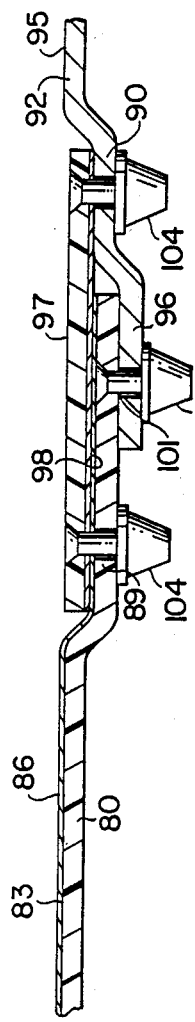

ELECTRICAL CONTINUITY MEANS FOR COMPOSITE JOINTS

TECHNICAL FIELD

The field of art to which this invention pertains is composite joints having electrical continuity and more particularly lightning protected composite joints for aircraft.

BACKGROUND ART

Composite structural components used on aircraft are subject to natural lightning strike discharges. Lightning strikes can create severe structural damage to unprotected composite components such as KEVLAR ® composites (DuPont DeNemours, Del.) or graphite epoxy structures in comparison to conventional aluminum structures. Composite components (hereinafter described as nonconductive since compared to aluminum they are extremely poor conductors) have been provided with lightning protection, for example, by using conductive coating materials such as aluminum. The aluminum can be applied in a number of manners such as a flame spray, a woven screen, a foil, or a plating. Alternative protection systems use other metals, such as copper, nickel, or silver, the latter typically formulated in a resin. The resin may be used to coat components or as conductive adhesive in composite component joints.

As shown in FIGS. 1–2, composite joints typically have a conductive bridge layer 1 disposed in the mechanical interface (e.g., load carrying path) of the joint. The conductive bridge layer 1 is in contact with the conductive layers 2 attached to the composite panels. The conductive bridge layer provides a means for conducting the charges across the joint and maintaining electrical continuity. The panels may be fastened and/or bonded. FIG. 3 illustrates a composite to metal joint. The composite bridge layer 1 is disposed in the mechanical interface. The conductive bridge layer 1 is in contact with the conductive layer 2 attached to the composite panel and the metal panel.

Although these joints provide electrical continuity and thus reduce lightning damage to the joint, there is a continual search in the art for improved lightning protected composite joints.

DISCLOSURE OF INVENTION

This invention is directed to a means for conducting an electrical charge from one nonconducting article having a conductive layer thereon to another article across a joint, wherein the means is displaced from the mechanical interface of the joint. This reduces joint stresses from electrical currents.

The foregoing and other features and advantages of the present invention will become more apparent from the following description and accompanying drawings.

BRIEF DESCRIPTION OF DRAWINGS

FIGS. 4–6 illustrate side views broken away of the joints of this invention including conductive bridge layers for conducting electrical charges without traversing the mechanical interface from a first panel to a second panel.

BEST MODE FOR CARRYING OUT THE INVENTION

Figure 1:
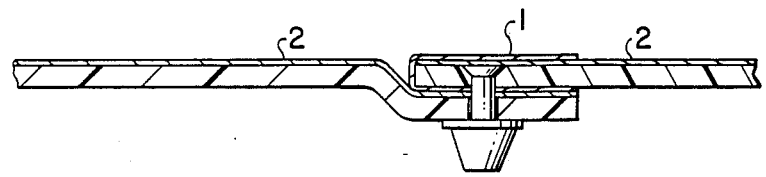
FIGS. 1–3 illustrate side views broken away of prior art joints including conductive bridge layers for conducting electrical charges across the mechanical interface from a first panel to a second panel.

According to FIG. 4, which depicts an overlap joint, a first composite panel 3 has an exterior surface 6 having a conductive layer 9 thereon. The conductive layer 9 typically does not wrap around the joint end 12 of the panel 3 because of trimming requirements. Typically, the conductive layer is applied during layup of the composite. Since the composites are trimmed to exact dimensions, any end trimming would remove any conductive layer that wraps around an end breaking the electrical continuity.

The first composite panel 3 has an end portion 12 and the composite panel 3 extends inward prior to the end portion 12. By extending inward is meant that the end portion 12 extends inward from the contour of the composite panel 3. A second composite panel 15 has an exterior surface 18 having a conductive layer 21 thereon. Again, typically the conductive layer 21 does not wrap over the joint end 24 of the composite panel 15. The second composite panel 15 has an intermediate portion 20 and the composite panel 15 extends inward prior to the intermediate portion 20. The composite panel 15 also has an end portion 24, and the intermediate portion 20 extends inward prior to the end portion 24. The end portion 12 of the first composite panel 3 is external to, overlaps and is joined to the end portion 24 of the second composite panel 15. Joining means such as a fastener 27 and/or adhesive bonding is used to provide a secure joint. A conductive means such as a bridge member 30 having a conductive bridge layer 33 provides electrical continuity from the conductive layer 9 of the first panel 3 to the conductive layer 21 of the second panel 15.

The conductive bridge layer 33 provides electrical continuity and the bridge member 30 provides an aerodynamic surface that follows the contours of the composite panels since the joint is recessed. The bridge member 30 is bonded to the two panels forming a permanent joint (a removable joint is described later). The conductive bridge layer 33 is displaced from the mechanical interface 36 of the composite panel joint. In this particular overlap joint the conductive means is disposed external to the conductive layers of the composite panels and external to the mechanical interface and the associated fasteners. In the prior art FIG. 1 a conductive layer that connected the composite conductive layers of the panels was disposed in the mechanical interface and conducted electricity across the interior of the joint.

The present configuration provides for electrical continuity between panels without having to traverse the mechanical connection. Such a traversal adversely effects the structural integrity of the composite joint requiring the joining means to exceed strength requirements associated with normal flight loads. Lightning strikes traversing the mechanical interface create magnetic flux fields which can separate the joint since repelling magnetic poles are created across the joint. In addition, lightning strikes can cause extreme localized heat at the joint interface resulting in joint degradation. This invention separates the electrical path that connects the parts from the joint interface.

In addition, by separating the electrical continuity path from the structural load path corrosion problems are reduced. The prior art joints typically used conductive adhesives in the joint either as a primary load carrier or as a redundant load path. The adhesive had to be conductive in order to lower the resistivity between the panels since the amount of adhesive used in structural bonds may be thick where parts do not mate evenly. Typically, the adhesives incorporate conductive metal particles such as silver that are dissimilar to the aluminum conductive layers and/or fasteners. These conductive adhesives can result in galvanic corrosion which can degrade integrity of these conductive layers and the the strength of the joint. In addition, the conductive particles typically lower the strength of the adhesive and thus strength of the joint. In contrast, the present joints do not need a conductive adhesive in the load path since the electrical path has been separated from the load carrying path. Furthermore, since the conductive bridge is thin and flexible, the adhesive layer can be thin reducing the need for a conductive adhesive that may cause corrosion. Finally, because the corrosion problems have been reduced and the lightning path has been separated from the load carrying path inspection of the interior of the joint, which ordinarily is inaccessible, is not as necessary. However, inspection and repair of the bridge is readily accessible since this is external to the joint, and is the area where any lightning damage would be present.

Another exemplary joint is depicted in FIG. 5. In that butt joint, a first composite panel 40 has an exterior surface 43 with a conductive layer 46 thereon. The first composite panel 40 has an end section 49 and the composite panel extends inward prior to the end section 49. A second composite panel 52 has an exterior surface 55 with a conductive layer 58 thereon. The second composite panel 52 has an end section 61 and the composite panel 52 extends inward prior to the end section 61. The two composite panels are joined with a joining member 64 that is disposed internal to the composite panels and mates the two end sections. Joining means such as fasteners 67 and/or adhesive bonding are used to provide a secure joint.

Figure 2:
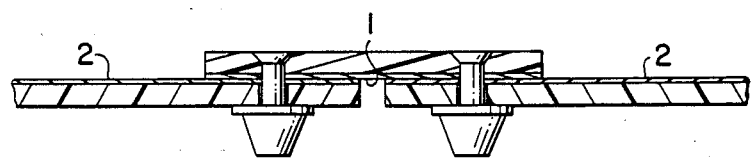

A conductive means such as a bridge member 70 having a conductive bridge layer 73 provides electrical continuity from conductive layer 46 of the first panel 40 to the conductive layer 58 of the second panel 52. The conductive layer 73 provides electrical continuity while the bridge member 70 may be used to provide an aerodynamic surface that follows the contours of the composite panels. The bridge member 70 is bonded to the two panels forming a permanent joint. The conductive bridge layer 73 is disposed external to the mechanical interface 76 of the joint between the composite panels. In this specific joint, the conductive means is disposed external to the conductive layers of the composite panels and associated fasteners. As with the previous overlap joint the advantages of this butt joint are readily apparent from an examination of FIG. 2. In FIG. 2 the conductive layer joining the two panels is disposed in the mechanical interface. This results in increased stresses and heat when the joint is subjected to lightning strikes. Furthermore, this joint is not accessible for inspection or repair. Also, this joint does not provide a flush aerodynamic surface.

Figure 3:
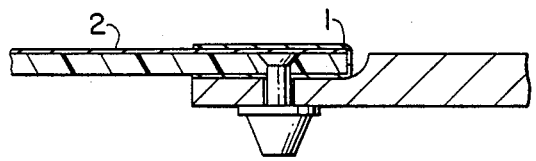

FIG. 6 depicts an exemplary removable joint that mates a composite panel to a conductive (e.g., metal) panel. In that removable joint, a first composite panel 80 has an exterior surface 83 with a conductive layer 86 thereon. The first composite panel 80 has an end section 89 and the composite panel extends inward prior to the end section 89. A second metal panel 92 has an exterior surface 95. The second panel 92 has an intermediate section 90 and that panel 92 extends inward prior to the intermediate section 90. The second panel 92 has an end section 96 and that intermediate section 90 extends inward prior to the end section 96. The end portion 89 of the composite panel 80 is external to, overlaps and is joined to the end portion 96 of the metal panel 92. Joining means such as a removable fastener 107 is used to provide a secure joint. A conductive means such as a bridge member 97 having a conductive bridge layer 98 provides electrical continuity from conductive layer 86 of the first panel 80 to the metal panel 92. The conductive bridge layer 98 provides electrical continuity while the bridge member 97 may be used to provide an aerodynamic surface that follows the contours of the composite panels. The bridge member 97 is removably fastened to the two panels forming a removable joint. Nonstructural removable fasteners 104 are used to hold the bridging member 97 to the joint. The bridge member 97 holds the conductive layer 98 in contact with the first panel's conductive layer and the metal panel. This facilitates the removability feature since for removability or inspectability the bridge member 97 is not bonded to the two panels. Furthermore, this is a removable joint since the first panel 80 is separable from the metal panel 92 by removing the structural fasteners 107 as there is no adhesive present. Again, the conductive bridge layer 98 is disposed external to the mechanical interface 101 of the joint between the panels. The advantages of this joint are readily apparent from an examination of FIG. 3. In FIG. 3, the conductive layer joining the two panels is disposed in the joint interface. This results in increased stresses and heat when the joint is subjected to lightning strikes.

The above described joints are merely exemplary of the types, configurations and materials that may be envisioned. For example, different joints may have one, both or more panels that are nonconductive. Thus, composite panels may be joined to other composite panels or composite panels may be joined to metal (e.g., aluminum) panels.

In addition, joints may be made that present an aerodynamic surface such as those described above or they may not be recessed below the panel contours. The bridge member is typically a thin composite material that is contoured to follow the panel surfaces. Resin may be used to fill in any recesses between the composite bridge member and the panels.

The conductive layers referred to in the exemplary joints may comprise a variety of materials. Exemplary materials are aluminum, copper, nickel, silver, and alloys thereof. In addition, the materials may take a variety of forms such as screening, strips, wire fabric, expanded foil, embossed metal foil, metal plating, flame sprays or conductive paints. Typically, the layers are about 0.02 mm to about 0.2 mm although other thicknesses may be used.

Thus, for permanent and removable joints and for joints having one or more composite members, this invention provides numerous advantages. The joint configuration separates the electrical path from the structural load path reducing joint stresses from lightning strike current. In addition, since the load carrying path is not required to be conductive, any adhesives used in the mechanical interface do not need to contain conductive particles. This eliminates galvanic corrosion between the adhesives and the conductive layers and/or the metal fasteners, etc. Damage from lightning strikes or corrosion are concentrated away from the mechanical interface. Thus, the electrical path may be inspected and repaired without dismantling the mechanical joint.

Although this invention has been shown and described with respect to detailed embodiments thereof, it will be understood by those skilled in the art that various changes in form and detail thereof may be made without departing from the spirit and scope of the claimed invention.

We claim:

1. A plurality of articles having a common joint including a mechanical interface, wherein at least one of said articles is a nonconductive article having a conductive layer thereon, and conductive means for conducting an electrical charge through said conductive layer across said joint to a second article wherein the improvement comprises:

said conductive means displaced from
said mechanical interface.

2. The plurality of articles as recited in claim 1 wherein said conductive means comprises a bridge member having a conductive layer joined to said articles.

3. The plurality of articles as recited in claim 1 wherein said bridge member is bonded to said articles.

4. The plurality of articles as recited in claim 1 wherein said bridge member is fastened to said articles.

5. The plurality of articles as recited in claim 1 wherein said bridge member follows the contour of said articles.

6. A joint comprising:
(a) a first composite panel mated to a second panel at said joint;
(b) said panels having external and internal surfaces;
(c) said first composite panel having a conductive layer on said external surface;
(d) said joint including a mechanical interface; and
(e) conductive means for conducting electrical charges from said conductive layer to said second panel, said conductive means displaced from said mechanical interface and disposed external to said conductive layer of the first panel.

7. The joint as recited in claim 6 wherein said conductive means comprises a conductive bridge layer.

8. The joint as recited in claim 7 wherein said conductive means comprises a bridge member having a conductive bridge layer thereon.

9. The joint as recited in claim 6 wherein
(a) said second panel is composite and has a conductive layer on said external surface;
(b) an end section of said first panel is disposed external to and overlapping and joined to an end section of said second panel; and
(c) said conductive means comprises a conductive bridge layer and said bridge layer is external to said conductive layer disposed on said second composite panel.

10. The joint as recited in claim 9 wherein said conductive means comprises a bridge member having said conductive bridge layer thereon said bridge member bonded or fastened to said panels.

11. The joint as recited in claim 10 wherein said bridge member follows the contour of said panels.

12. The joint as recited in claim 10 wherein said first and second panels extend inward prior to said overlap.

13. The joint as recited in claim 6 wherein
(a) said second panel is composite and has a conductive layer on said external surface;
(b) said composite panels having end sections;
(c) a joining member attached to said interior surfaces of said end sections; and
(d) said conductive means comprises a conductive bridge layer and said bridge layer is external to said conductive layer disposed on said second composite panel.

14. The joint as recited in claim 13 wherein said conductive means comprises a bridge member having said conductive bridge layer thereon said bridge member bonded to said panels.

15. The joint as recited in claim 14 wherein said bridge member follows the contour of said panels.

16. The joint as recited in claim 13 wherein said first and second panels extend inward prior to said joining member.

17. The joint as recited in claim 6 wherein
(a) said second panel is metal;
(b) an end section, of said first panel is disposed external to and overlapping and joined to an end section of said second panel; and
(c) said conductive means comprises a conductive bridge layer.

18. The joint as recited in claim 17 wherein said conductive means comprises a bridge member having said conductive bridge layer thereon said bridge member removably fastened to said panels.

19. The joint as recited in claim 18 wherein said bridge member follows the contour of said panels.

20. The joint as recited in claim 18 wherein said first and second panels extend inward prior to said overlap.

* * * * *